(12) United States Patent
Coward

(10) Patent No.: US 7,383,102 B2
(45) Date of Patent: Jun. 3, 2008

(54) SLUG FLOW PROTECTION SYSTEM

(75) Inventor: Brian A. Coward, Southampton (GB)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 11/004,489

(22) Filed: Dec. 3, 2004

(65) Prior Publication Data

US 2006/0122734 A1    Jun. 8, 2006

(51) Int. Cl.
*G05D 7/00* (2006.01)

(52) U.S. Cl. .................. 700/282; 175/48; 73/1.34; 702/116

(58) Field of Classification Search .......... 700/275, 700/282; 702/116; 175/48; 73/1.34, 152.21, 73/152.22
See application file for complete search history.

(56) References Cited

U.S. PATENT DOCUMENTS

| 5,975,219 A * | 11/1999 | Sprehe .................. 175/48 |
| 6,772,082 B2 * | 8/2004 | van der Geest et al. .... 702/116 |
| 2003/0005747 A1 * | 1/2003 | van der Geest et al. .... 73/1.16 |
| 2003/0168391 A1 * | 9/2003 | Tveiten .................. 210/188 |

* cited by examiner

*Primary Examiner*—Albert Decady
*Assistant Examiner*—Douglas S Lee
(74) *Attorney, Agent, or Firm*—Ohlandt, Greeley, Ruggiero & Perle, L.L.P

(57) ABSTRACT

A protection system is provided that mitigates damage caused by slug flow in oil and gas production systems. The protection system opens or closes a choke valve based upon flow parameters such as the separator pressure and level, and the riser pressure. The choke valve position is calculated based upon a number of factors of the production system in order to maintain efficiency while providing safety.

20 Claims, 5 Drawing Sheets

SLUG FLOW PROTECTION SYSTEM

BACKGROUND OF THE INVENTION

1. Field of the Invention

This disclosure relates generally to protection systems for mitigation of damage caused by slug flow and more particularly, to a method and apparatus for protecting against slug flow.

2. Description of the Related Art

In multi-phase flow systems used in the oil and gas industry, crude oil, water and gas are transported from a well through a pipeline system to a process facility. In offshore oil production, the crude oil, water, and gas are generally simultaneously transported through a sub-sea pipeline to gas/liquid separating equipment, such as a separator, which is located on an offshore platform or onshore. This type of multiphase fluid flow results in different types of flow regimes occurring, including slug flow.

Slug flow can be problematic because it consists of alternating liquid and gas surges, which results in an unwanted flow pattern of alternating lack of flow or production starvation, large liquid slugs, and strong gas surges. Alternating patterns of liquid slugs and gas surges being supplied to a separator reduces its efficiency, since the separator is operated with acceptable pressure fluctuations and delivers a lower liquid content in the gas outlet and a lower gas content in the liquid outlet in order to accommodate for the pressure fluctuations.

The liquid slugs can also grow under certain flow conditions, which leads to severe slugging with the above-described unwanted flow patterns and inefficiency. Liquid slugs can also be generated by operational changes, such as with the increase of the fluid production during the start-up of a pipeline.

Monitoring for slug flow can be difficult due to the number of variables involved in the slug flow formation. Measurement of the flow rate in the sub-sea pipeline is difficult due to the multiphase flow therein and can require costly equipment to do so.

Accordingly, there is a need for mitigation of slug flow, which maintains the efficiency of the separator, while maintaining the efficiency of the oil and gas production system. There is a further need for a slug protection and mitigation system that is easily and cost effectively incorporated into the oil and gas production system, while reliably mitigating against damage caused by slug flow. The method and apparatus of the present invention provides for slug flow mitigation and protection.

SUMMARY OF THE INVENTION

In one aspect, a method of mitigating slug flow damage in an oil and gas production system having a riser, a manifold and a separator is provided. The method comprises monitoring flow parameters at the separator and upstream of the separator, and regulating flow into the separator based upon the flow parameters.

In another aspect, a computer readable program embodied in an article of manufacture is provided. The computer readable program comprises computer readable program instructions for mitigating slug flow damage in an oil and gas production system having a riser, a manifold and a separator. The article of manufacture comprises program instructions for causing a computer to monitor flow parameters at the separator and upstream of the separator, and program instructions for causing the computer to regulate flow into the separator based upon the flow parameters.

In a further aspect, a protection system for mitigating damage from slug flow in an oil and gas production system having a riser, a manifold and a separator is provided. The protection system comprises a control processing unit, a parameter measuring device and a flow control device. The parameter measuring device is disposed at the separator and/or upstream of the separator. The parameter measuring device measures flow parameters and communicates parameter signals representative of the flow parameters to the control processing unit. The flow control device is disposed upstream of the separator. The control processing unit generates a throttle command based at least in part upon the flow parameters and communicates the throttle command to the flow control device thereby causing the flow control device to regulate flow into the separator.

The above-described and other features and advantages of the present disclosure will be appreciated and understood by those skilled in the art from the following detailed description, drawings, and appended claims.

DETAILED DESCRIPTION OF THE INVENTION

Figure 1:
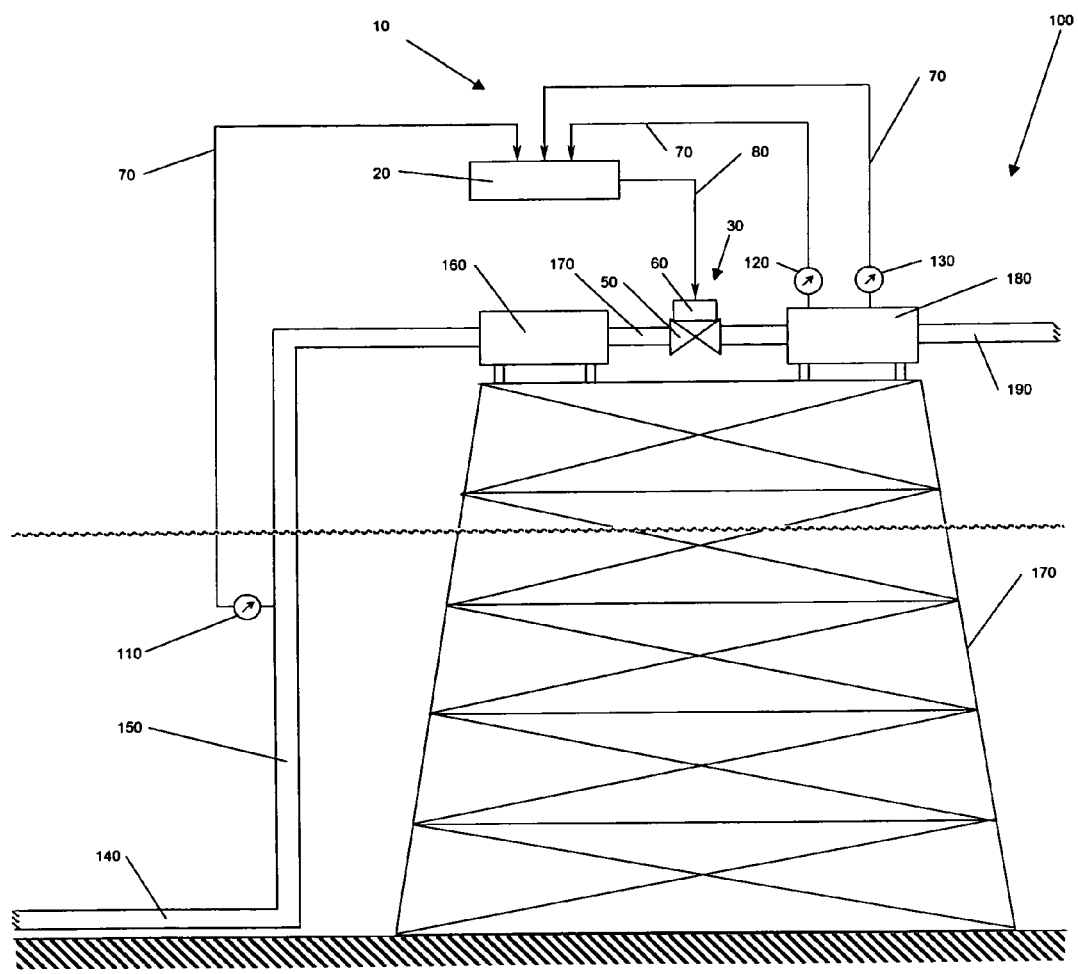
FIG. 1 is a schematic illustration of a portion of an oil and gas production system and a slug flow protection and mitigation system thereof.
Figure 2:
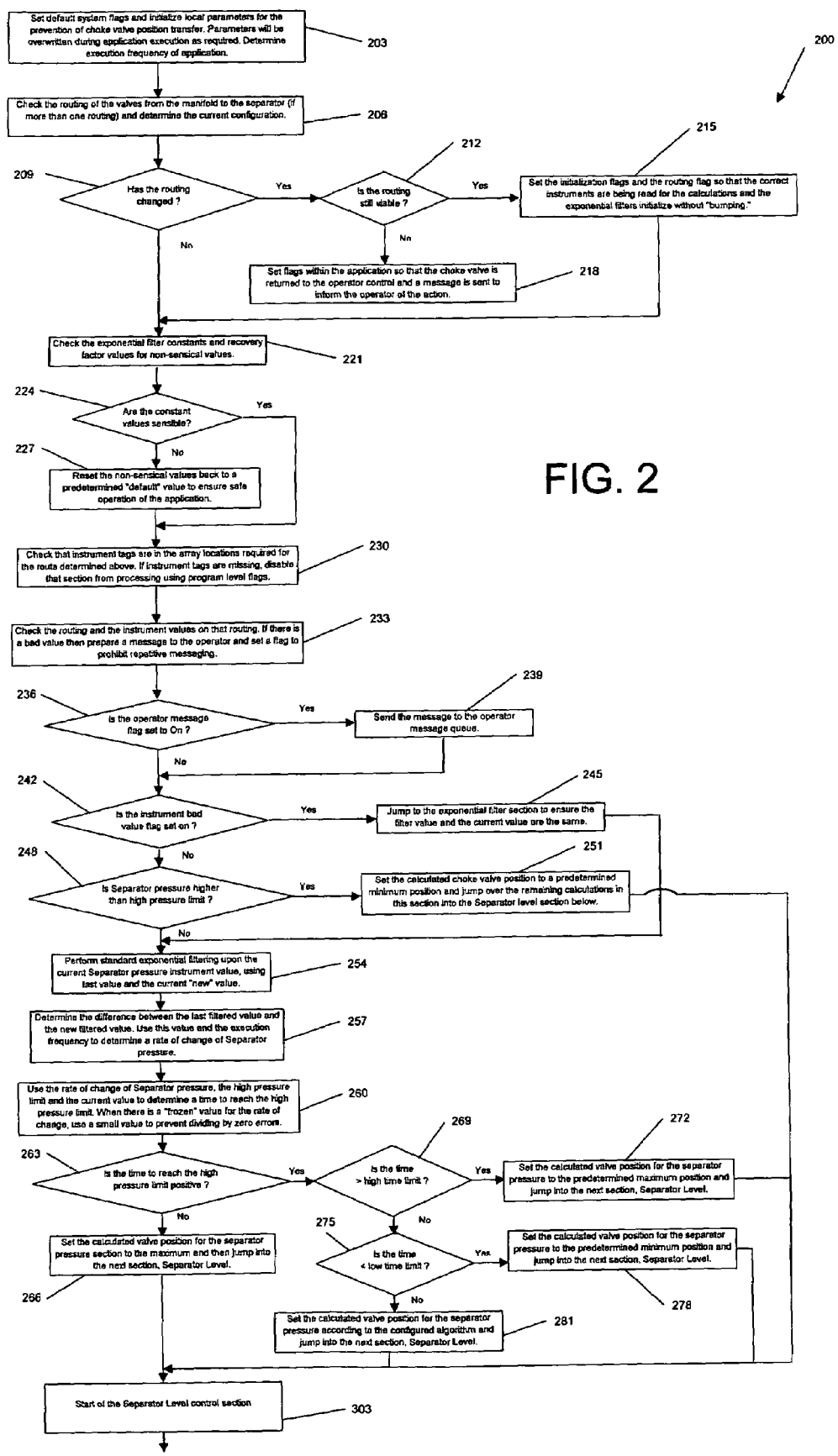
FIG. 2 is a flow chart illustrating a portion of a slug flow protection and mitigation system for the oil and gas production system of FIG. 1.
Figure 3:
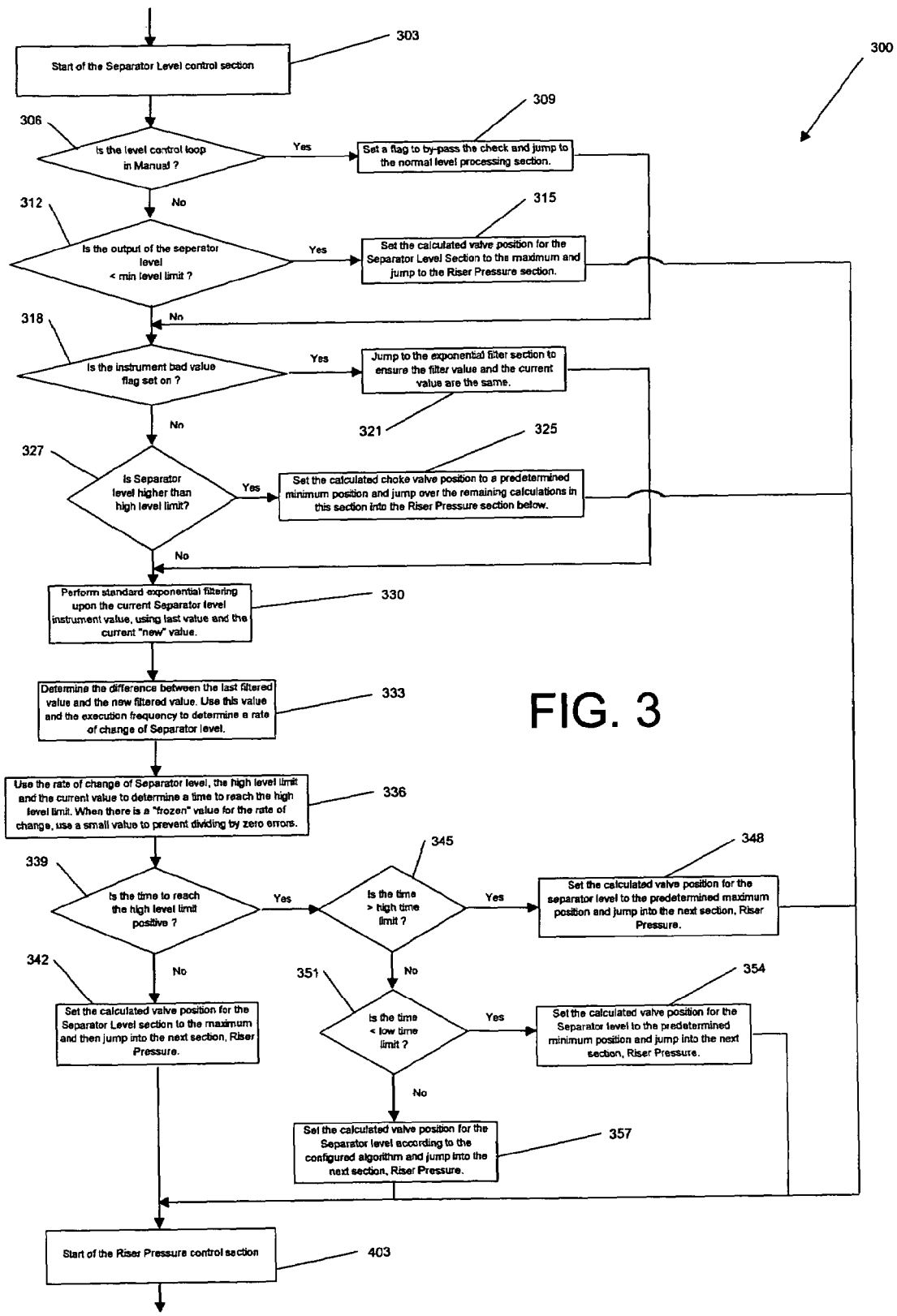
FIG. 3 is a flow chart illustrating another portion of a slug flow protection and mitigation system for the oil and gas production system of FIG. 1.
Figure 4:
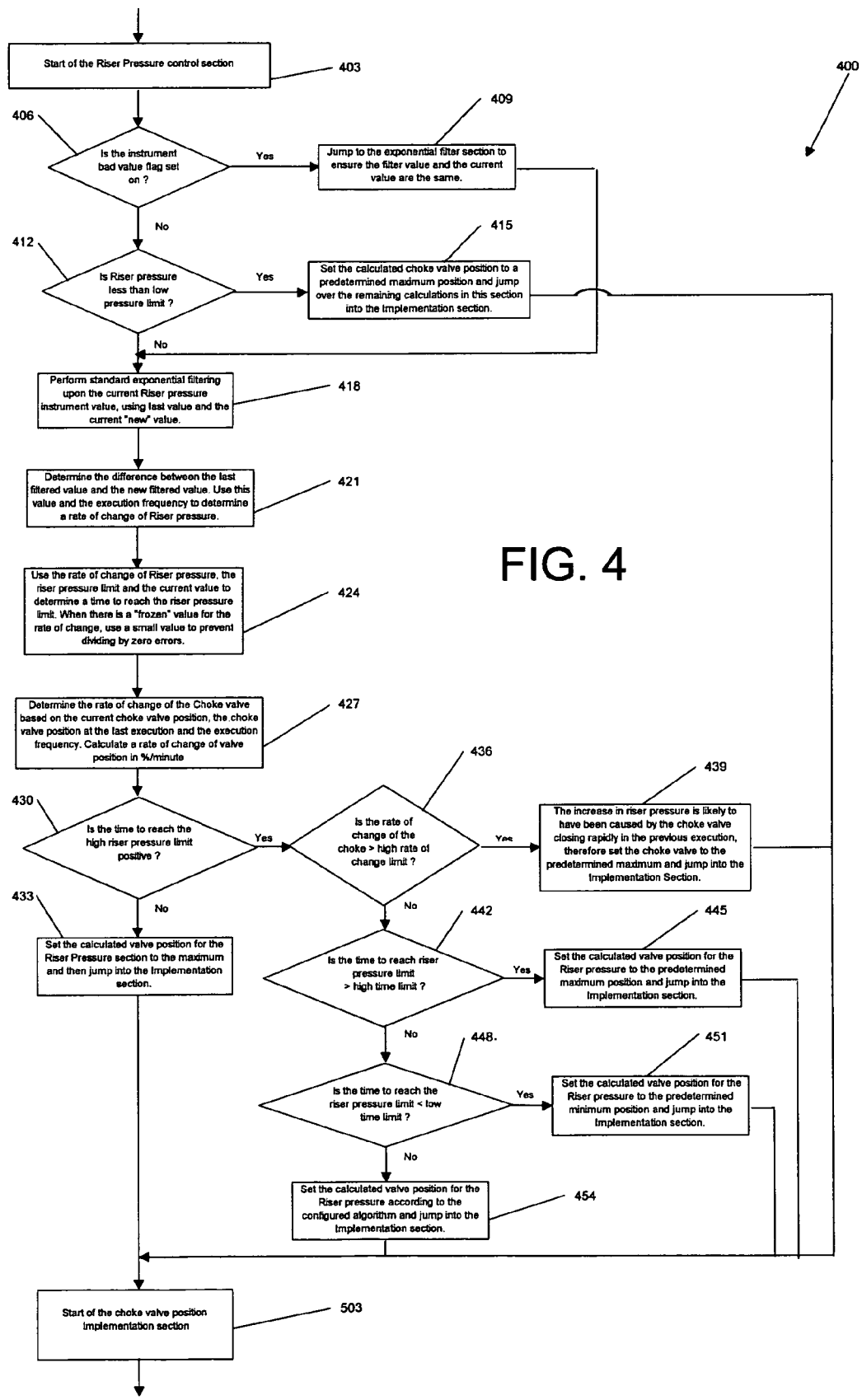
FIG. 4 is a flow chart illustrating yet another portion of a slug flow protection and mitigation system for the oil and gas production system of FIG. 1.
Figure 5:
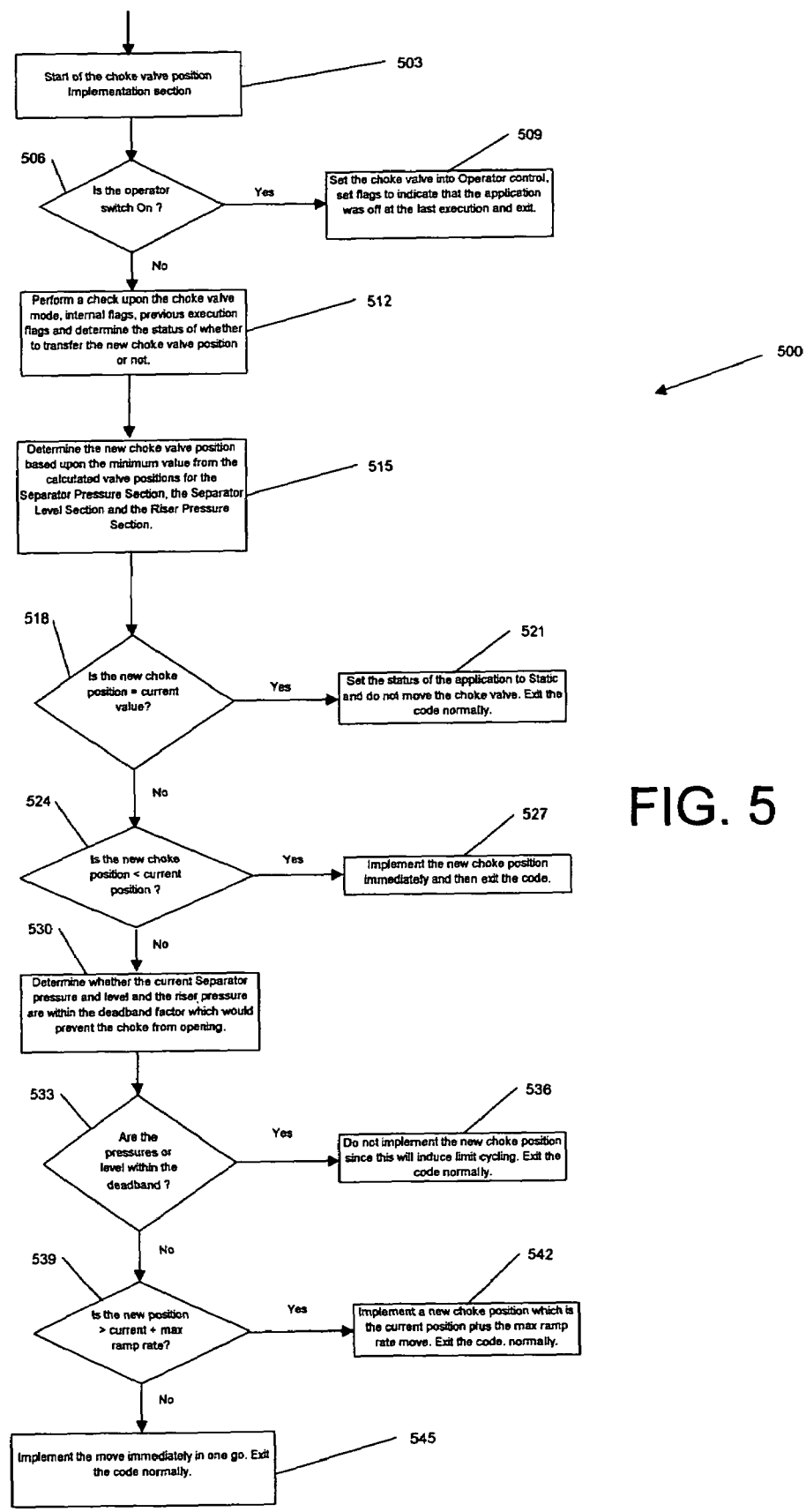
FIG. 5 is a flow chart illustrating a further portion of a slug flow protection and mitigation system for the oil and gas production system of FIG. 1.

Referring now to the drawings and in particular to FIG. 1, an exemplary embodiment of a slug flow protection and mitigation system generally referred to by reference numeral 10 is illustrated. Protection system 10 provides protection and mitigation of damage caused by slug flow that occurs in an oil and gas production system, a portion of which is shown and generally represented by reference numeral 100. Protection system 10 is operably connected or coupled to production system 100, and provides monitoring and control of the multiphase flow in the production system.

Protection system 10 has a control processing unit (hereinafter CPU) 20 that is in communication with a number of monitoring or sensing devices. In the exemplary embodiment, the CPU 20 is in communication with monitoring or measuring devices that include, but are not limited to, a riser pressure gauge 110, a separator pressure gauge 120 and a separator level gauge or measuring device 130. The production system 100 has a sub-sea pipeline 140 that is connected with a wellhead (not shown) and a riser 150. The riser 150 transports the multiphase flow from the pipeline 140 to a manifold 160 that is seated on a platform 170. A routing conduit 170 connects the manifold 160 to a gas/liquid separator 180. A platform outlet pipeline system 190 then transports the separated phases of the flow from the separator 180 for further processing.

The portion of the production system 100 shown in FIG. 1 is illustrative of an oil and gas well production system and can include various components, features, configurations, numbers of components and/or positionings of components that are usable with such systems, which may or may not be shown in the exemplary embodiment. For example, while the exemplary embodiment shows a single conduit for routing conduit 170, the conduit can include a number of conduits, valves or connectors in a number of different configurations.

In the exemplary embodiment, riser pressure gauge 110, separator pressure gauge 120 and separator level measuring device 130 are preferably monitoring and sensing devices that are utilized by production system 100 for other control and/or safety functions. By utilizing pre-existing monitoring and safety devices, protection system 10 can be easily incorporated into the oil and gas production system 100, and can be done so cost effectively.

Protection system 10 has a flow control device 30. In this exemplary embodiment, flow control device 30 has a throttling choke valve 50 and an actuator 60. However, the present disclosure contemplates the use of other flow control devices 30 that can be controlled to regulate the flow into separator 180. The choke valve 50 is capable of opening and closing to a calculated or predetermined position with a high degree of accuracy and in a predetermined or specified period of time. Preferably, the choke valve 50 can be moved to its calculated or predetermined position within 5 to 15 seconds. The actuator 60 can be any device capable of causing the choke valve 50 to open and close to the desired position and in the desired time period, such as, for example, a motorized throttling system. The present disclosure contemplates a number of flow control devices 30 and/or choke valves 50 being used in various configurations, such as, for example, where there is a plurality of routing conduits 170 that connect the manifold 160 with the separator 180.

CPU 20 receives parameter signals 70 from riser pressure gauge 110, separator pressure gauge 120 and separator level measuring device 130 representative of the pressure or level from the respective measuring device. Protection system 10 utilizes the operational, system or flow parameters of riser pressure, separator pressure and separator level to safely and efficiently control the multiphase flow into the separator 180 and mitigate the impact of slug flow on the production system 100. However, the present disclosure contemplates the monitoring and/or use of other parameters and/or flow parameters in controlling the multiphase flow into the separator 180. The parameter signals 70 can be in any form, e.g., analog or digital. The data from these signals is processed by CPU 20, as will be described in greater detail later, and a throttle command or signal 80 can be generated and communicated to actuator 60 causing the choke valve 50 to move to the desired position.

CPU 20 is described herein by way of example as a control processing unit. Of course, it is contemplated by the present disclosure for CPU 20 to include any programmable circuit, such as, but not limited to, computers, processors, microcontrollers, microcomputers, programmable logic controllers, application specific integrated circuits, and other programmable circuits. It is further contemplated by the present disclosure that CPU 20 is any number of control devices providing various types of control, e.g., centralized, distributed, redundant and/or remote control.

The closing of choke valve 50 to a desired position protects against, and mitigates damage resulting from, slug flow into separator 180 by reducing the multiphase flow into the separator. Slug flow that is left unchecked, including the rapid transition from a period of gas production with no liquid and a period of liquid production with no gas, results in the process variables, such as, for example, pressure and level, exceeding high limits, which causes a safety shutdown of the production system 100. The safety shutdown and resulting start-up of the production system 100 is a costly process, e.g., loss of inertia in the production process. The closing of choke valve 50 prevents the process variables from exceeding the high limits, which maintains the efficiency of the separator 180 and production system 100, while also reducing or eliminating other unwanted affects, such as, for example, increased shock loading on the compressor trains (not shown) and/or increased environmental emissions. The opening of choke valve 50 maintains the efficiency of the production system 100 by maximizing the multiphase flow into the separator 180 within safe bounds or limits. The method and apparatus described herein preferably controls flow from the manifold 160 to the separator 180. By doing so, protection system 10 avoids limiting the input to the production system 100 (e.g., a safety shutdown) when the capacity for output is still within safe bounds, and thus maintains the efficiency of the production system.

Referring to FIGS. 2 through 5, a method of controlling the flow control device 30 and the choke valve 50 is shown in four application sections: a separator pressure control section 200, a separator level control section 300, a riser pressure control section 400 and a choke valve position implementation section 500. Each of these four sections is part of a control process that is implemented by CPU 20. The process of FIGS. 2 through 5 is preferably a software program or application that can be run by the CPU 20, and is more preferably a computer program product having a computer useable medium with a computer readable code means embodied in the medium for control of the choke valve 50. The software program or application is preferably readable by CPU 20, tangibly embodying a program of instructions executable by the CPU 20 to perform method steps for controlling the choke valve 50. However, the present disclosure contemplates implementation of the method steps described herein, and the resulting control of choke valve 50, in alternative ways as well.

In step 203, the default system flags are set and the local parameters are initialized for the prevention of the choke valve position transfer. The local parameters are overwritten during the execution of the application as necessary. The execution frequency of the application is also established. Determination of these parameters and the execution frequency is based upon the particular implementation platform, e.g., the processing speed of CPU 20. The parameters and the execution frequency can also be based upon the severity of the slugging that has been experienced for a particular production system 100, as well as other factors that maintain the safety of the production system while providing efficiency. Typically, the execution frequency will be from 10 seconds to less than one second but the present disclosure contemplates alternative execution frequencies.

In step 206, the routing of the conduit and valves (e.g., routing conduit 170) from the manifold 160 to the separator 180 is checked to determine the current configuration, where more than one routing exists. Step 209 provides for a determination of any change in the routing from the previous application execution. Where the routing has changed, a determination is made in step 212 as to whether the current routing is viable for monitoring and control. If the routing is viable, step 215 sets the initialization flags and the routing flag so that the correct instruments are being read for the calculations and exponential filters initialize without bumping. If the routing is no longer viable, step 218 sets the flags within the application so that the choke valve 50 is returned to the operator control and a message is sent to inform the operator of the action. Where a number of choke valves 50 are being used by protection system 10, CPU 20 can also set the correct choke valve or valves to be throttled.

In steps 221 and 224, the exponential filter constants and recovery factor values are checked for non-sensical values. If the values are not sensible, step 227 resets the non-sensical values back to a predetermined default value to ensure safe operation of the application. Step 230 checks that the instrument tags are in the array locations required for the route determined in step 206. If the instrument tags are missing, the particular application section that utilizes those instruments is disabled from processing using program level flags. In step 233, the routing and the instrument values on that routing are checked. If there is an improper value then a message to the operator is prepared and a flag is set to prohibit repetitive messaging. Step 236 and 239 determine if the operator message flag is set to "On" and, if so, the message is sent to the operator message queue. In step 242, a determination is made if the instrument bad value flag has been set to "On", and, if so, in step 245, the application skips to step 254 in order to ensure the filter value and the current value are the same.

Step 248 determines whether the separator pressure is higher than the high pressure limit. The high pressure limit is a predetermined value based upon the pressure capacity of the separator 180, safety concerns, and the operational efficiency of the separator and the production system 100. The present disclosure contemplates the use of dynamic high pressure limits for the separator 180, which can be based on operational parameters and other factors, such as, for example, a history of slugging severity for the production system 100. If the separator pressure exceeds the limit, step 251 sets the calculated choke valve position to a predetermined minimum position and the remaining calculations in the separator pressure control section 200 are skipped so that the application jumps into the separator level control section 300.

Where the separator pressure is less than the high pressure limit, step 254 performs standard exponential filtering upon the current separator pressure instrument value, using the last value from the previous execution of the application and the current "new" value. The standard exponential filtering is effective in removal of high frequency noise and is very economical in practice. This filtering method can be tested to ensure its accuracy. The present disclosure contemplates the use of other filtering methods for the pressure instrument value.

In step 257, the difference between the last filtered value and the new filtered value is determined. This difference and the execution frequency of the application from step 203 is used to determine a rate of change of the separator pressure. Step 260 uses the rate of change of the separator pressure, the high pressure limit and the current value of the pressure instrument to determine a time at which the high pressure limit will be reached. To avoid a division by zero error, "frozen" values for the rate of change of the separator pressure are replaced by small values.

The application determines whether the separator pressure is approaching the high pressure limit in step 263. If the separator pressure is not approaching the high pressure limit, i.e., the rate of change of the separator pressure from step 260 is negative, then step 266 sets the calculated valve position for the separator pressure section to the maximum position and skips into the separator level control section 300. If the separator pressure is approaching the high pressure limit, steps 269 and 275 determine whether the time to reach the high pressure limit exceeds the high time limit or is less than the low time limit. The high and low time limits for reaching the separator pressure limit are predetermined values based upon the execution frequency of the application, as well as other factors, such as, for example, safety concerns and the operational efficiency of the separator 180 and the production system 100. The present disclosure contemplates the use of dynamic high and low time limits for reaching the separator pressure limit, which can be based on operational parameters and other factors, such as, for example, a history of slugging severity for the production system 100.

Where the time for the separator pressure to reach the high pressure limit exceeds the high time limit, step 272 sets the calculated choke valve position for the separator pressure to the predetermined maximum position and skips to the separator level control section 300. Where the time for the separator pressure to reach the high pressure limit is less than the low time limit, step 275 sets the calculated choke valve position for the separator pressure to the predetermined minimum position and skips to the separator level control section 300. However, if the time for the separator pressure to reach the high pressure limit falls within the window between the high and low time limits, then step 281 sets the calculated valve position for the separator pressure according to the configured algorithm and skips into the separator level control section 300.

The configured algorithm for determining the position for the choke valve 50 according to step 281 is based at least in part on one or more of the following factors: maximum and minimum times for the choke valve 50 to reach the calculated valve position, the valve position from previous executions of the application, the current valve position and the maximum and minimum choke valve positions, as determined by the operator. The algorithm can include other factors, such as, for example, the severity of slugging and tuning factors to compensate for any characteristics in the performance curve of the choke valve 50.

A determination of whether the level control loop is in manual control is made in step 306. If so, a flag is set to by-pass the check and skip to the normal level processing in step 318. If the loop is not in manual, then step 312 determines whether the output of the separator level is less than a minimum level limit. Where the output is less than the minimum level, the calculated valve position for the separator level section is set to the maximum position by step 315 and the application skips to the riser pressure control section 400. Steps 306 through 315 provide an excess capacity check for the production system 100. To maximize the efficiency of the production system, the level control loop of steps 306 through 315 determines whether the separator 180 can safely handle more through-put.

If the output of the separator level is above the minimum level limit, step 318 determines if the instrument bad value flag has been set to "On", and, if so, in step 321, the application skips to step 330 in order to ensure that the filter value and the current value are the same. Step 327 determines whether the separator level is higher than the high level limit. The high level limit is a predetermined value based upon the volumetric capacity of the separator 180, safety concerns, and the operational efficiency of the separator and the production system 100. The present disclosure contemplates the use of dynamic high level limits for the separator 180, which can be based on operational parameters and other factors, such as, for example, a history of slugging severity for the production system 100. If the separator level exceeds the limit, step 325 sets the calculated choke valve position to a predetermined minimum position and the remaining calculations in the separator level control section 300 are skipped so that the application jumps into the riser pressure control section 400.

Where the separator level is less than the high level limit, step 330 performs standard exponential filtering upon the current separator level instrument value, using the last value from the previous execution of the application and the current "new" value. Alternative filtering methods may also be applied is step 330. In step 333, the difference between the last filtered value and the new filtered value is determined, and this difference along with the execution frequency of the application is used to determine a rate of change of the separator level. Step 336 uses the rate of change of the separator level, the high level limit and the current value of the level measuring instrument to determine a time at which the high level limit will be reached. To avoid a division by zero error, "frozen" values for the rate of change of the separator level are replaced by small values.

The application determines whether the separator level is approaching the high level limit in step 339. If the separator level is not approaching the high level limit, i.e., the rate of change of the separator level from step 333 is negative, then step 342 sets the calculated valve position for the separator level section to the maximum position and skips into the riser pressure control section 400. If the separator level is approaching the high level limit, steps 345 and 351 determine whether the time to reach the high level limit exceeds the high time limit or is less than the low time limit. The high and low time limits for reaching the separator level limit are predetermined values based upon the execution frequency of the application, as well as other factors, such as, for example, safety concerns and the operational efficiency of the separator 180 and the production system 100. The present disclosure contemplates the use of dynamic high and low time limits for reaching the separator level limit, which can be based on operational parameters and other factors, such as, for example, a history of slugging severity for the production system 100.

Where the time for the separator level to reach the high level limit exceeds the high time limit, step 348 sets the calculated choke valve position for the separator level to the predetermined maximum position and skips to the riser pressure control section 400. Where the time for the separator level to reach the high level limit is less than the low time limit, step 354 sets the calculated choke valve position for the separator level to the predetermined minimum position and skips to the riser pressure control section 400. However, if the time for the separator level to reach the high level limit falls within the window between the high and low time limits, then step 357 sets the calculated valve position for the separator level according to the configured algorithm for the separator level control section 300 and skips into the riser pressure control section 400.

The configured algorithm for determining the position for the choke valve 50 according to step 357 can be based at least in part on one or more of the following factors: maximum and minimum times for the choke valve 50 to reach the calculated valve position, the valve position from previous executions of the application, the current valve position and the maximum and minimum choke valve positions, as determined by the operator. The algorithm can include other factors, such as, for example, the severity of slugging and tuning factors to compensate for any characteristics in the choke valve 50 performance curve. The algorithm can be the same or a similar mathematical formula as in the separator pressure control section 200 except substituting the values of the separator level for the separator pressure.

In step 406, a determination is made as to whether the instrument bad value flag has been set to "On", and, if so, in step 409, the application skips to step 418 in order to ensure that the filter value and the current value are the same. Step 412 determines whether the riser pressure is lower than the low pressure limit. The low pressure limit is a predetermined value based upon the pressure capacity of the riser 150, safety concerns, and the operational efficiency of the separator 180 and the production system 100. The present disclosure contemplates the use of dynamic low pressure limits for the riser 150, which can be based on operational parameters and other factors, such as, for example, a history of slugging severity for the production system 100. If the riser pressure is less than the low limit, step 415 sets the calculated choke valve position to a predetermined maximum position and the remaining calculations in the riser pressure control section 400 are skipped so that the application jumps into the choke valve position implementation section 500.

Where the riser pressure is higher than the low pressure limit, step 418 performs standard exponential filtering upon the current riser pressure instrument value, using the last value from the previous execution of the application and the current "new" value. Alternative filtering methods may also be applied is step 418. In step 421, the difference between the last filtered value and the new filtered value is determined, and this difference along with the execution frequency of the application is used to determine a rate of change of the riser pressure. Step 424 uses the rate of change of the riser pressure, the low pressure limit and the current value of the pressure measuring instrument to determine a time at which the low pressure limit will be reached. To avoid a division by zero error, "frozen" values for the rate of change of the riser pressure are replaced by small values.

In step 427, a rate of change of the choke valve 50 is determined based on the current choke valve position, the choke valve position at the previous execution of the application and the execution frequency of the application. The rate of change of the choke valve position can be calculated in %/minute. The application determines whether the riser pressure is approaching the high pressure limit in step 430, i.e., whether the time to reach the high pressure limit is positive. If the riser pressure is not approaching the high pressure limit, i.e., the rate of change of the riser pressure from step 430 is negative, then step 433 sets the calculated valve position for the riser pressure section to the maximum position and skips into the choke valve position implementation section 500.

If the riser pressure is approaching the high pressure limit then step 436 determines if the rate of change of the choke valve position is greater than a high rate of position change limit. The high rate of position change limit is a predetermined value based upon the choke valve 50, the actuator 60, safety concerns, the operational efficiency of the separator 180 and the production system 100, and the effect of flow rate changes on the multiphase flow. The present disclosure contemplates the use of dynamic high rate of position change limits for the choke valve 50, which can be based on operational parameters and other factors, such as, for example, a history of slugging severity for the production system 100.

If the rate of change of the choke valve position is greater than the high rate of position change limit then step 439 sets the choke valve position to the predetermined maximum position and the application skips to the choke valve position implementation section 500. Step 439 makes the assumption that the increase in riser pressure is likely to have been caused by the choke valve 50 closing rapidly in the previous execution.

If the rate of change of the choke valve position is less than the high rate of position change limit, steps 442 and 448 determine whether the time to reach the high pressure limit exceeds the high time limit or is less than the low time limit. The high and low time limits for reaching the riser pressure limit are predetermined values based upon the execution frequency of the application, as well as other factors, such as, for example, safety concerns and the operational efficiency of the riser 180 and the production system 100. The present disclosure contemplates the use of dynamic high and low time limits for reaching the riser pressure limit, which can be based on operational parameters and other factors, such as, for example, a history of slugging severity for the production system 100.

Where the time for the riser pressure to reach the high pressure limit exceeds the high time limit, step 445 sets the calculated choke valve position for the riser pressure to the predetermined maximum position and skips to the choke valve position implementation section 500. Where the time for the riser pressure to reach the high pressure limit is less than the low time limit, step 451 sets the calculated choke valve position for the riser pressure to the predetermined minimum position and skips to the choke valve position implementation section 500. However, if the time for the riser pressure to reach the high pressure limit falls within the window between the high and low time limits, then step 454 sets the calculated valve position for the riser pressure according to the configured algorithm for the riser pressure control section 400 and skips into the choke valve position implementation section 500.

The configured algorithm for determining the position for the choke valve 50 according to step 454, similar to steps 281 and 357, can be based at least in part on one or more of the following factors: maximum and minimum times for the choke valve 50 to reach the calculated valve position, the valve position from previous executions of the application, the current valve position and the maximum and minimum choke valve positions, as determined by the operator. The algorithm can include other factors, such as, for example, the severity of slugging and tuning factors to compensate for any characteristics in the choke valve 50 performance curve. The algorithm can be the same or a similar mathematical formula as in the separator pressure control section 200 and/or the separator level control section 300.

Step 503 begins the choke valve position implementation section 500. The calculated choke valve positions have been determined based on each of the three previous sections of the application, i.e., the separator pressure control section 200, the separator level control section 300 and the riser pressure control section 400. The order in which these three previous sections is carried out can be rearranged, and in the case of multiple processing capability can be done simultaneously.

Step 506 determines whether the operator switch is "On" and, if so, step 509 sets the choke valve 50 (along with actuator 60) into operator control mode. Flags are set to indicate that the application was off at the last execution and the application is exited. If the operator switch is off then step 512 performs a check upon the choke valve mode, the internal flags, and the previous execution flags, and based upon this check determines the status of whether the new choke valve position can be transferred.

In step 515, the new choke valve position is determined based upon a comparison of the minimum value from the calculated valve positions for the separator pressure control section 200, the separator level control section 300 and the riser pressure control section 400. The minimum value is utilized to provide the maximum safety based upon the criteria utilized in the configured algorithms of the separator pressure control section 200, the separator level control section 300 and the riser pressure control section 400.

Step 518 determines if the new choke valve position is equal to the current position. If so, step 521 sets the status of the application to static and does not move the choke valve 50. The application is then exited. Step 524 determines if the new choke valve position is less than the current position. If so, then step 527 implements the new choke valve position immediately through use of throttle command 80 communicated to actuator 60. The application is then exited.

In steps 530 and 533, a determination is made as to whether the current value for the separator pressure, the separator level and the riser pressure are within the deadband factor which would prevent the choke from opening. If the pressures or level are within the deadband, then step 536 prevents the implementation of the new choke position since this will induce limit cycling. The application is then exited.

Where the current value for the separator pressure, the separator level and the riser pressure are outside of the deadband factor, step 539 compares the new choke valve position with the current choke valve position and the maximum ramp rate for the choke valve 50 and actuator 60. If the new choke valve position is greater than the current choke valve position plus the maximum ramp rate, step 542 limits the implementation or movement of the choke valve position to the current choke valve position plus the maximum ramp rate move, e.g., a maximum ramp position. The application is then exited. If the new choke valve position is less than the current choke valve position plus the maximum ramp rate, step 545 implements the movement immediately in one step or pass. The application is then exited.

Separator pressure control section 200, separator level control section 300 and riser pressure control section 400 utilize pre-determined minimum and maximum choke valve positions based upon the pressures or levels being outside of certain limits or ranges. These pre-determined valve positions ensure safe operation, such as, for example, moving the choke valve 50 to a minimum position when the pressure in separator 180 is too high. These pre-determined valve positions also provide efficient operation of the production system 100, such as, for example, moving the choke valve 50 to a maximum position when the pressure in the separator 180 is decreasing. The maximum and minimum pre-determined choke valve positions are based upon a number of factors, such as, for example, the volume capacity of the separator 180, safety concerns, and the operational efficiency of the separator and the production system 100. The present disclosure contemplates the use of dynamic maximum and minimum choke valve positions, which can be based on operational parameters and other factors, such as, for example, a history of slugging severity for the production system 100. Additionally, the maximum and minimum pre-determined choke valve positions can be different for each of the separator pressure control section 200, the separator level control section 300 and/or the riser pressure control section 400.

Protection system 10 monitors and controls the output along production system 100 rather than controlling the input. The protection system 10 reduces or increases the entire multiphase flow into the separator 180 to reduce or eliminate damage caused by the slug flow rather than attempting to control the slug flow by varying individual parameters of the multiphase flow. The method described with respect to the application or process of FIGS. 2 through 5 provides pre-emptive mitigation and control of slug flow rather than reactive control.

The protection system 10 is cost effective because it can use existing instrumentation of the production system 100 and requires only one or more throttle choke valves 50 or other flow control devices 30 to be incorporated into the conduit in the proximity of the separator 180. Once implemented, the protection system 10 requires little maintenance and provides a high degree of protection from slug flow to the separator 180, as well as to the rest of the production system 100.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of mitigating slug flow in a multiphase system comprising a riser, a manifold and a separator, the method comprising:
monitoring flow parameters at the separator and upstream of the separator; regulating flow into the separator based upon said flow parameters to mitigate said slug flow in a pre-emptive manner; disposing a choke valve upstream of the separator; and opening or closing said choke valve to regulate said flow; defining a permissible range for said flow parameters; and opening said choke valve to a maximum position or closing said choke valve to a minimum position when at least one of said flow parameters is outside of said permissible range; and determining a new choke position for said choke valve that is between said maximum position and said minimum position, wherein said new choke position is based at least in part on at least one of the factors selected from the group consisting of: time for said choke valve to reach said new choke position, a choke position from a previous opening or closing of said choke valve, and a current choke position.

2. The method of claim 1, wherein said choke valve is disposed between the manifold and the separator.

3. The method of claim 1, wherein said flow parameters are a separator pressure at the separator, a liquid level at the separator and a riser pressure at the riser.

4. The method of claim 3, further comprising: communicating parameter signals representative of said flow parameters to a control processing unit; generating a throttle command at said control processing unit based at least in part upon said flow parameters; and communicating said throttle command to said choke valve, wherein said throttle command causes said choke valve to open or close to a new choke position.

5. The method of claim 3, wherein opening or closing of said choke valve is performed by a motorized throttling system.

6. The method of claim 3, further comprising: determining whether said separator pressure, said liquid level or said riser pressure are within a deadband range which would induce limit cycling; and preventing said choke valve from being opened or closed if said separator pressure, said liquid level or said riser pressure are within said deadband range.

7. The method of claim 4, further comprising: determining whether said new choke position requires opening or closing of said choke valve that exceeds a maximum ramp rate of said choke valve; and opening or closing said choke valve to a maximum ramp position that does not exceed said maximum ramp rate if said new choke position requires opening or closing of said choke valve exceeding said maximum ramp rate.

8. A computer readable program embodied in an article of manufacture comprising computer readable program instructions for mitigating slug flow in a multiphase system having a riser, a manifold and a separator, said program comprising: program instructions for causing a computer to monitor flow parameters at the separator and upstream of the separator; program instructions for causing said computer to regulate flow into the separator based upon said flow parameters to mitigate said slug flow in a pre-emptive manner; program instructions for causing said computer to open or close a choke valve disposed upstream of the separator thereby regulating said flow; program instructions for causing said computer to define a permissible range for said flow parameters; and program instructions for causing said computer to open said choke valve to a maximum position or close said choke valve to a minimum position when at least one of said flow parameters is outside of said permissible range; and program instructions for causing said computer to determine a new choke position for said choke valve that is between said maximum position and said minimum position, wherein said new choke position is based at least in part on at least one of the factors selected from the group consisting of: time for said choke valve to reach said new choke position, a choke position from a previous opening or closing of said choke valve, and a current choke position.

9. The program of claim 8, wherein said choke valve is disposed between the manifold and the separator.

10. The program of claim 8, wherein said flow parameters are a separator pressure at the separator, a liquid level at the separator and a riser pressure at the riser.

11. The program of claim 10, further comprising: program instructions for causing said computer to read parameter signals representative of said flow parameters; program instructions for causing said computer to generate a throttle command based at least in part upon said flow parameters; and program instructions for causing said computer to communicate said throttle command to said choke valve, wherein said throttle command causes said choke valve to open or close to a new choke position.

12. The program of claim 10, wherein opening or closing of said choke valve is performed by a motorized throttling system.

13. The program of claim 10, further comprising: program instructions for causing said computer to determine whether said separator pressure, said liquid level or said riser pressure are within a deadband range which would induce limit cycling; and program instructions for causing said computer to prevent said choke valve from being opened or closed if said separator pressure, said liquid level or said riser pressure are within said deadband range.

14. The program of claim 11, further comprising: program instructions for causing said computer to determine whether said new choke position requires opening or closing of said choke valve that exceeds a maximum ramp rate of said choke valve; and program instructions for causing said computer to open or close said choke valve to a maximum ramp position that does not exceed said maximum ramp rate if said new choke position requires opening or closing of said choke valve exceeding said maximum ramp rate.

15. A system for mitigating slug flow in a multiphase system comprising a riser, a manifold and a separator, the system comprising: a control processing unit; a parameter measuring device disposed at the separator and/or upstream of the separator, said parameter measuring device measuring flow parameters and communicating parameter signals representative of said flow parameters to said control processing unit; and a flow control device disposed upstream of the separator, wherein said control processing unit generates a throttle command based at least in part upon said flow parameters and communicates said throttle command to said flow control device thereby causing said flow control device to regulate flow into the separator to mitigate said slug flow in a pre-emptive manner, wherein said flow control device is a choke valve that is openable or closeable to a new choke position, wherein said control processing unit defines a permissible range for said flow parameters and opens said choke valve to a maximum position or closes said choke valve to a minimum position when at least one of said flow parameters is outside of said permissible range, wherein said control processing unit determines a new choke position for said choke valve that is between said maximum position and said minimum position, and wherein said new choke position is based at least in part on at least one of the factors selected from the group consisting of: time for said choke valve to reach said new choke position, a choke position from a previous opening or closing of said choke valve, and a current choke position.

16. The system of claim 15, wherein said choke valve is disposed between the manifold and the separator.

17. The system of claim 15, wherein said parameter measuring device is a separator pressure gauge that measures a separator pressure at the separator, a riser pressure gauge that measures the riser pressure at the riser and a liquid level gauge that measures the liquid level at the separator.

18. The system of claim 17, further comprising a motorized throttle actuator that causes said choke valve to open or close to said new choke position, said motorized throttle actuator being in communication with said control processing unit.

19. The system of claim 17, wherein said control processing unit determines whether said separator pressure, said liquid level or said riser pressure are within a deadband range which would induce limit cycling and prevents said choke valve from being opened or closed if said separator pressure, said liquid level or said riser pressure are within said deadband range.

20. The system of claim 17, wherein said control processing unit determines whether said new choke position requires opening or closing of said choke valve that exceeds a maximum ramp rate of said choke valve and opens or closes said choke valve to a maximum ramp position that does not exceed said maximum ramp rate if said new choke position requires opening or closing of said choke valve exceeding said maximum ramp rate.

* * * * *